April 8, 1941.    F. S. FLOETER    2,238,019
LATHE
Filed Nov. 27, 1937    2 Sheets-Sheet 1

INVENTOR
FREDERICK S. FLOETER
BY
ATTORNEY

April 8, 1941. F. S. FLOETER 2,238,019
LATHE
Filed Nov. 27, 1937 2 Sheets-Sheet 2

INVENTOR.
FREDERICK S. FLOETER
BY
ATTORN

Patented Apr. 8, 1941

2,238,019

UNITED STATES PATENT OFFICE 2,238,019

LATHE

Frederick S. Floeter, Saginaw, Mich., assignor to Wickes Bros., Saginaw, Mich., a corporation of Michigan Application November 27, 1937, Serial No. 176,883

9 Claims. (Cl. 82—25)

This invention relates to lathes of the multiple tool type wherein a work piece, such as a crankshaft of an automobile, is rotated coaxially with the center line of the lathe while one or more of its line bearings are rough-turned by tools that are fed in from opposite sides, after which a third tool advances and takes the finishing cut, thus completing the work at one setting.

Until quite recently such work required two lathes, one for rough-turning, the other for finishing. Usually the shaft was mounted on conical centers to aline it and the line bearings were rough-turned in the first lathe. The shaft was then removed from that lathe and, using its same conical centers, was remounted in the second lathe, equipped with finishing tools.

A serious production difficulty arose from that procedure because occasionally a completed shaft would have its finishing cut out of register with its primary roughing cut, in a direction lengthwise of the shaft. For reasons well understood by engine builders such mismatching is not permissible.

The main trouble was due to the centering bores in the ends of the shafts. Shafts with conical centers can not be taken from lathes in which they have been rough-turned and afterwards be remounted in other lathes for finishturning with any assurance of always getting exact endwise matching of the roughing surfaces, turned by the first lathe, with the finished surfaces produced by another lathe; therefore, mismatching occasionally occurred, regardless of the use of various kinds of corrective relocating gauges, stops, or similar devices. Of course conical centers could be drilled very accurately; nevertheless deviation from the desired longitudinal setting of the shaft in the second lathe in excess of the commercially permissible endwise tolerance of, say, five one-thousandths of an inch, might be caused by slight wear or by a loose particle between the bearing surfaces of the conical bore and the conical end of a lathe spindle.

In order to remedy such difficulties and to provide reliable and accurate means for both rough-turning and finishing at one setting of the work piece in a single machine I have heretofore designed and built lathes in which the first rough-turning cuts were taken by opposed roughing tools in the customary way, and the final finishing cuts were taken immediately afterwards by means of broaching tools that operated by being reciprocated lengthwise.

Those combination roughing tool and broach-finishing machines are now being used successfully in commercial crank-shaft production on a large scale, but reciprocating broaches and their associated parts require a large, heavy and relatively costly machine structure in which to install them.

The purpose of this device is to satisfy a real need that has long existed in the crank-shaft industry for a relatively inexpensive double purpose lathe of simplified design, yet having great strength, capacity and durability that will both rough-turn and finish a plurality of line bearings without any likelihood of endwise mismatching, and at one setting of the work.

So far as I am aware the problem has never been solved satisfactorily prior to my present improvement, without using a bank of broaching tools.

The needed simplification just mentioned involved the use of conventional chisel edged tools instead of broaches for the finishing operation. It was found impossible, however, to satisfactorily incorporate such a finishing tool in the conventional double acting type of rough-turning lathe.

Conventional crank-shaft lathes that were adapted only for rough-turning employed two roughing tools opposite each other, but mountings for these tools afforded no space for installing any additional chisel-edged finishing tool with its necessary guides and driving and controlling mechanisms. Conventional lathes, therefore, obviously afforded no basis or starting point from which to work out a solution of the present problem, i. e., devising a double purpose machine possessing the desirable features of compactness, great strength, accuracy of work produced and less initial cost.

My present improvement is operatively associated with a rough-turning lathe of quite different type. It is illustrated in United States Patent No. 1,799,291, issued to me April 7, 1931, on an application filed November 8, 1926, entitled "Tool-carrying device for double acting turning lathe."

The patented lathe has oppositely directed tools, but is characterized by having the back tool and slide inverted and located at a considerably higher level than the front tool and higher than the lathe axis.

With that tool arrangement ample unobstructed space is presented beneath one of the roughing tools in which may be installed an additional finishing tool, together with the mechanisms by which the tool is reciprocated toward and from the work piece.

According to my present improvement the finishing tool is slidingly mounted in guides on the base of a lathe, such as the one shown in the patent, and is housed in the space below the higher roughing tool. The finishing tool operates alternately with and in timed relation to the roughing tools.

Where several bearings have to be turned, all roughing cuts are preferably taken simultaneously, but the finishing cuts are preferably taken serially to avoid generating chatter marks and to produce more perfectly finished bearings.

The preferred arrangement of mechanisms will now be specifically described, whereby finished crank-shafts can be produced faster and more economically in one relatively inexpensive lathe than could formerly be done by two lathes, or by a single heavy lathe equipped with reciprocating broach-finishing tools.

In the drawings, Fig. 1 is a part sectional, part diagrammatic view of a crank-shaft lathe embodying my improvement in a preferred form.

Figure 1:
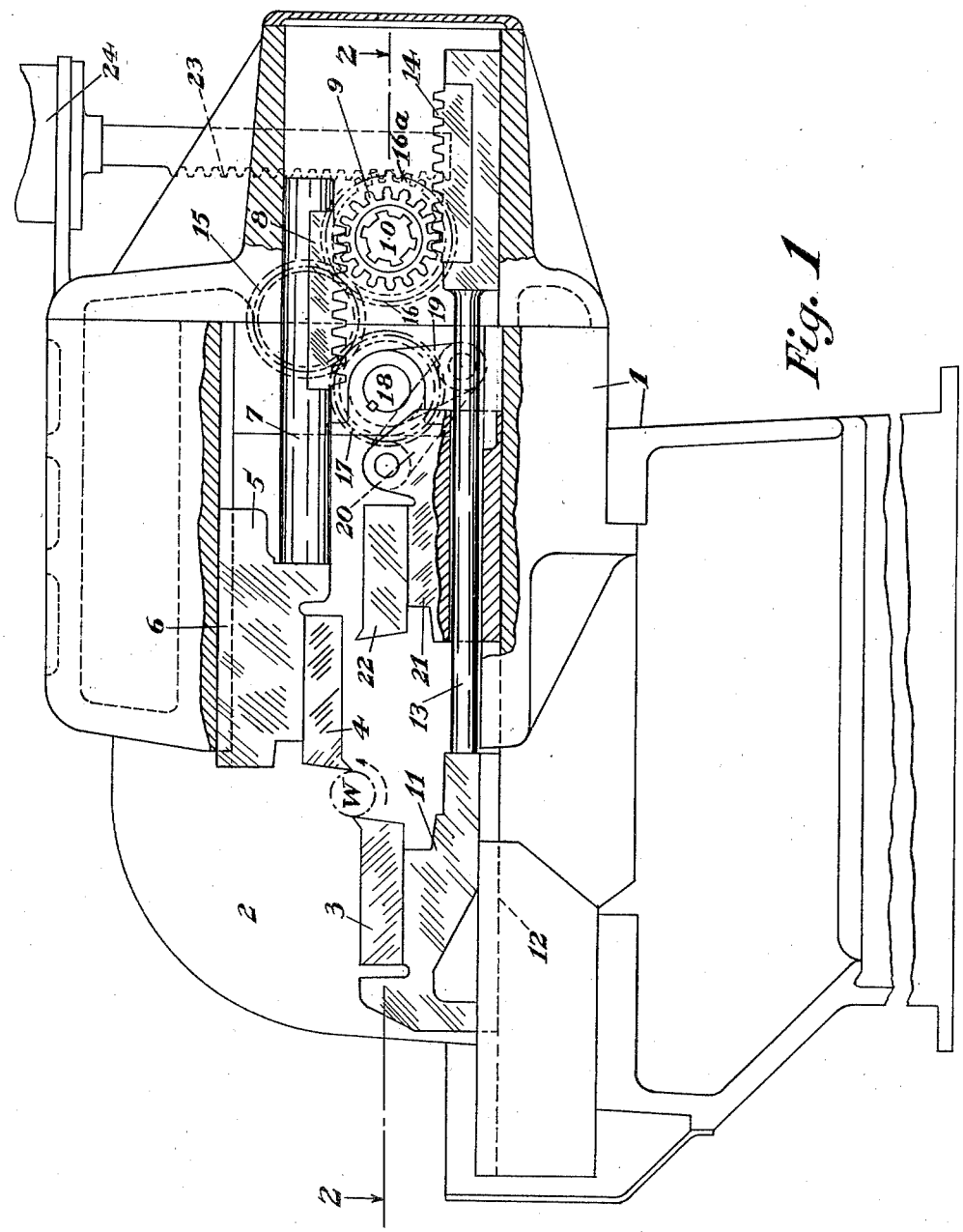

Numeral 1 designates the base of a crank-shaft lathe of either the "center drive" or the "universal center" type, the work piece being mounted for rotation in one or more chucks, 2. The part 2 may be considered a work holding means, but not necessarily a reversible one.

Two roughing tools are preferably used, 3 being the front tool for cutting on the forward periphery of the work W, and 4 being the rear tool. Front tool 3 is mounted on a slide 11 that rides upon a lower guideway 12. Fixed to the slide 11 is a rearwardly extending bar 13 having a toothed rack 14. Rear tool 4 is on a slide 5, moved back and forth crosswise of the lathe along an overhead guideway 6 by means of an extension bar 7 having a rack 8. The racks 8 and 14 both mesh with a gear 9 which is splined to a primary tool-actuating shaft 10 on base 1. For finish-turning the work, means is installed in the space beneath the overhead rear tool 4 and its inverted guideway 6, as follows:

A pinion 15, Fig. 1, is the intermediate member of a train of three gears 16, 15, 17. Gear 16 is keyed to the primary shaft 10, and gear 17 is fixed to a finishing-tool rock-shaft 18 mounted on base 1. A crank 19 is keyed to shaft 18, its outer end being pivotally connected by a link, 20, to a slide 21 that carries the finishing tool 22. Slide 21 is provided with an opening through which the rearwardly extending bar 13 of tool 3 passes freely. Shaft 10 is rotated in one direction, then in the other by means of a gear 16a that meshes with a lengthwise reciprocatory rack 23 actuated by a source of power such as hydraulic cylinder 24.

Movement of rack 23 upward rotates the primary shaft 10 and gear 9 to feed the roughing tools 3 and 4 into the work W simultaneously. The same upward movement, through gear train 16, 15, 17, crank 19, and link 20, brings the finishing tool 22 into its retracted position, Fig. 1.

Figure 3:
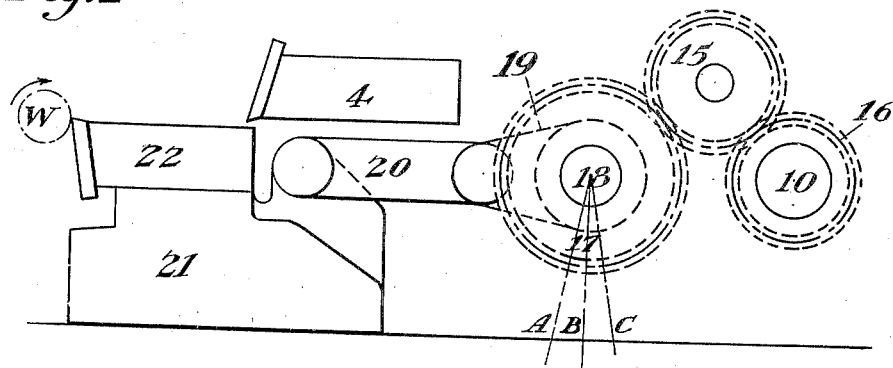
Fig. 3 is a diagrammatic side view of the finishing tool slide, its actuating mechanism being in extended position.

Upon completion of the roughing cut, the rack 23 moves downward, withdraws the tools 3 and 4 from the work and moves the finishing tool 22 into its cutting position, Fig. 3.

The broken arrow, Fig. 1, indicates that the work piece W is being rotated in counter-clockwise direction while the roughing tools 3 and 4 are making their cut. Upon its completion rotation of the chuck 2 may be reversed and the work may revolve clockwise during the finishing cut, as indicated by the solid arrow in Fig. 3.

Chuck reversing means is omitted from the drawings and description because it is well known in the lathe art, and does not constitute an essential part of my invention. For the same reason I have omitted the description of conventional and well known means by which the actions of cylinder 24 and rack 23 are controlled to produce correct tool timing, speed, dwell, and retraction.

Figure 2:
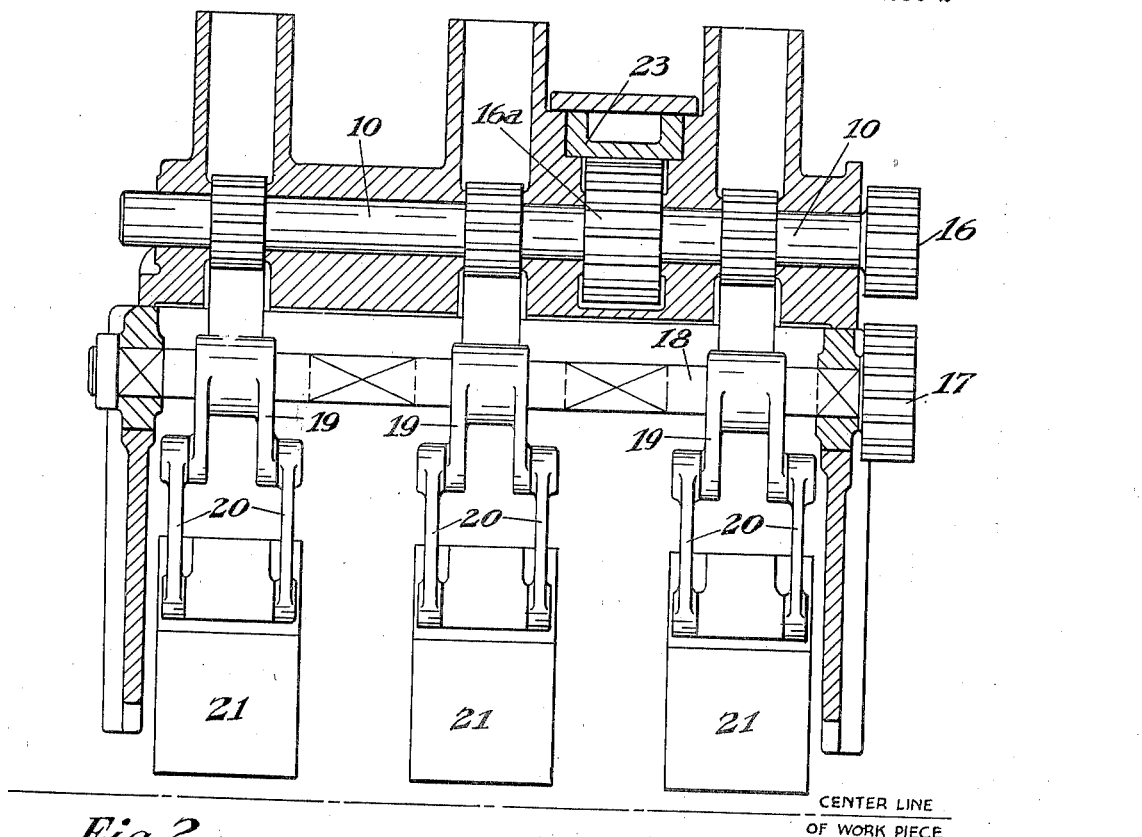
Fig. 2 is a horizontal part sectional view on line 2—2 of Fig. 1, showing a lathe arranged for turning a shaft having three line bearings.

Now referring to Fig. 2, which is a fragmentary horizontal sectional view taken on line 2—2 of Fig. 1, plural tool slides 21 are shown in extended position. The main tool-actuating rack 23 is shown at the top, in mesh with pinion 16a on shaft 10. The actuating train for finish-turning is located at the right and includes gear 16 on shaft 10, and gear 17 on shaft 18. The intermediate gear 15 is arranged as indicated in Fig. 1. The gear train is arranged to oscillate a number of double crank arms 19, their connecting links 20, and the tool slides 21 that carry the finishing tools 22. A greater or less number of such mechanisms may be employed, as required by the work in hand.

The parts are so proportioned that each crank 19 oscillates through about one hundred and ten degrees. Broken lines A, B, and C, Fig. 3, represent relative angular positions of the three cranks 19 on shaft 18 whereby the three finishing tools are caused to engage the work in regular order. Preferably not more than one or two of the tools 22 should cut at the same time, thus avoiding all likelihood of producing chatter marks on the finished surface due to any possible slight yielding of the lathe parts or work under heavy loads on the cutting tools.

When rack 23 is at the top limit of its travel and the finishing tools 22 are drawn back, as in Fig. 1, the respective cranks 19 are in the positions A, B, C which are illustrated by broken lines, Fig. 3.

Referring again to Fig. 1, it will be apparent that the finishing tool 22 is advancing toward the work W while roughing tool 4 is being retracted and that their cutting edges will pass very close to each other. This arrangement is preferred because it enables the finishing tool 22 to attack the work W at almost the same position on the cutting circle as did the rear roughing tool 4.

From Fig. 3 it is apparent that the final approach of each finishing tool 22 to the work W is very gradual, due to the fact that crank 19 and the link 20 are then in almost straight alinement. The final finishing cut is consequently very slight, diminishing to zero, and the resulting bearing surface is therefore smooth and commercially free from imperfections.

It is now seen that in this invention the desired results have been attained by employing a pair of roughing tools arranged substantially as described in my patent previously referred to and by installing beneath the elevated rear tool and in cooperation therewith a finishing tool with its appropriate tool-actuating mechanisms. The roughing and finishing tools are actuated in properly timed relation, and the work piece is preferably rotated in one direction while the roughing tools are cutting and in reverse direction while the finishing tools are in action.

It has also been shown that the finishing tools may be arranged to feed into the respective line bearings one or more at a time in any desired sequence and thus assist in producing smooth, exactly shaped bearings.

The term "finishing" has been employed to designate the final turning of a bearing by means of a sharp-edged lathe tool, and that kind of tool has been illustrated, but it is obvious that a grinding wheel or other suitable means may be employed for finishing. Such alternative devices are to be understood as being included in the terms "finishing" and "finishing tools."

Although I have set forth a lathe structure wherein the roughing tools and the finishing tools are all driven from the same shaft, 10, they may be driven from independent sources, provided they are actuated in appropriately timed relation to each other, without departing from my invention as defined in certain of the appended claims.

Having thus described my invention, what I claim and desire to secure by Letters Patent is:

1. In a lathe having means for mounting a work piece for rotation about its longitudinal axis and having a plurality of pairs of oppositely directed roughing tools movable simultaneously into engagement with the work piece, a tool of each pair being disposed higher than the other tool, a finishing tool located beneath each higher tool and slidingly mounted for movement toward and away from the cutting circle at substantially the point of attack of the said higher roughing tool, means for reciprocating said finishing tools comprising links connected thereto, a crank pivoted to an end of each of said links, an oscillatory shaft carrying said cranks, a gear on said shaft, an intermediate gear meshing therewith, a primary shaft having a gear meshing with the said intermediate gear, a rack and pinion drive mechanism for said primary shaft, means operatively connecting said primary shaft with the respective pairs of roughing tools and adapted to retract the roughing tools while the finishing tools are being advanced, and vice versa.

2. In combination, a lathe adapted to support a work piece which is rotatable about its longitudinal axis said lathe having roughing tools at opposite sides of the work piece and means, including a primary shaft, for simultaneously moving said tools into engagement with the work piece, the rearward roughing tool being higher than the forward tool, a finishing tool located beneath said higher roughing tool and mounted for movement toward and away from the work piece, means for reciprocating said finishing tool comprising a link having an end connected thereto, a crank pivoted to the other end of said link, an oscillating shaft for said crank, a train of gears operatively connecting the said shaft with the above mentioned primary shaft; the said train, crank, and link being proportioned relatively to the primary shaft to retract the finishing tool when the roughing tools are advanced, and vice versa.

3. In combination, a lathe adapted to support a work piece which is rotatable, and having roughing tools oppositely directed and actuated for simultaneous feeding-in movements, one of said roughing tools being supported from a guideway higher than the work piece, an unobstructed space being presented below the said tool, a finishing tool mounted in said space for movement toward and away from the work piece, the lines of travel of the roughing tool and finishing tool being adjacent and parallel and the cutting edges of said finishing and roughing tools being arranged to attack the work piece at substantially the same point on the cutting circle.

4. In combination, a lathe adapted to support a work piece rotatable alternately in opposite directions and having roughing tools oppositely directed and actuated for simultaneous feeding-in movements, one of said roughing tools being located higher than the other so as to present an unobstructed space below the first-mentioned tool, a finishing tool mounted in said space for reciprocatory movement toward and away from the work piece, its line of travel being adjacent the line of travel of the said higher roughing tool and parallel therewith, the alternate rotations of the work being appropriately timed relatively to the respective cutting engagements of the said roughing tools and the finishing tool.

5. In combination, a lathe adapted to support a work piece rotatable alternately in opposite directions, and having a roughing tool actuated for feeding-in movements relative to said work piece, said roughing tool being substantially higher than the work and supported in an overhead guideway so as to present an unobstructed space below the roughing tool, a finishing tool mounted in said space for reciprocatory movement toward and away from said work piece, its line of travel being adjacent the line of travel of the said roughing tool, the said alternate rotations of the work piece being in opposite directions being in appropriately timed relation to the respective cutting engagements of the said roughing tool and the finishing tool.

6. In a lathe including means for supporting a work piece which is rotatable about its longitudinal axis and likewise periodically reversible in its direction of rotation, said lathe having oppositely directed roughing tools and means actuating the same toward and from the work piece; a finishing tool mounted beneath one of said roughing tools, said finishing tool being arranged to attack the cutting circle of the work piece at substantially the same point as the said roughing tool, means for feeding said roughing tools into the work piece during the retraction of the finishing tools and vice versa; the said periodical reversals of direction of rotation of the work piece being in appropriately timed relation with the cutting action of the roughing tools and the cutting action of the finishing tools, respectively.

7. In a lathe having means for mounting a work piece which is rotatable and reversible in its direction of rotation, said lathe including a roughing tool and means actuating said tool toward and away from the work piece; a finishing tool operable beneath said roughing tool and arranged so as to attack the cutting circle of the work piece at substantially the same point as said roughing tool, means for feeding-in the said roughing tool during retraction of the finishing tool, and vice versa; the reversals of direction of rotation of the work piece being in appropriately timed relation with the engagements of the work piece by the roughing tool and the finishing tool respectively.

8. In a lathe adapted to support a rotatable work piece and having roughing tools oppositely directed and actuated for simultaneously feeding-in movements, a finishing tool mounted for movement toward and away from the work piece, the line of travel of the cutting edge of said finishing tool being adjacent and parallel therewith the line of travel of the cutting edge of one of said roughing tools and being arranged to attack the work piece at substantially the same point on the cutting circle, the respective cutting engagements of the roughing tools and the finishing tool being in appropriately timed relation.

9. In a lathe having means for mounting a work piece for rotation, said lathe including a roughing tool and means actuating said tool toward and away from the work piece; a finishing tool operable beneath said roughing tool, and traveling therewith, the cutting edges of the cutting tool and of the finishing tool being arranged to attack the work piece at substantially the same location on the cutting circle, means for feeding in the roughing tool during retraction of the finishing tool and vice versa.

FREDERICK S. FLOETER.